United States Patent
Memon

(10) Patent No.: US 10,392,510 B2
(45) Date of Patent: Aug. 27, 2019

(54) MODIFIED ASPHALT WITH GELATINOUS CARRIER MATERIAL

(71) Applicant: G. Mohammed Memon, Ashburn, VA (US)

(72) Inventor: G. Mohammed Memon, Ashburn, VA (US)

(*) Notice: Subject to any disclaimer, the term of this patent is extended or adjusted under 35 U.S.C. 154(b) by 192 days.

(21) Appl. No.: 15/608,332

(22) Filed: May 30, 2017

(65) Prior Publication Data

US 2018/0346725 A1 Dec. 6, 2018

(51) Int. Cl.
*C08K 5/00* (2006.01)
*C08K 3/06* (2006.01)
*C08K 5/16* (2006.01)
*C08L 95/00* (2006.01)

(52) U.S. Cl.
CPC ............... *C08L 95/00* (2013.01); *C08K 3/06* (2013.01); *C08K 5/0025* (2013.01); *C08K 5/16* (2013.01); *C08L 2312/00* (2013.01); *C08L 2555/24* (2013.01); *C08L 2555/84* (2013.01)

(58) Field of Classification Search
None
See application file for complete search history.

(56) References Cited

U.S. PATENT DOCUMENTS

| | | | |
|---|---|---|---|
| 6,429,241 B1 | 8/2002 | Liang | |
| 6,444,731 B1 | 9/2002 | Memon | |
| 6,451,886 B1 | 9/2002 | Krivohlavek et al. | |
| 6,478,951 B1 * | 11/2002 | Labib | C08L 77/10 106/273.1 |
| 6,818,687 B2 | 11/2004 | Memon | |
| 2002/0111401 A1 | 8/2002 | Izumoto | |
| 2004/0186205 A1 * | 9/2004 | Memon | C08L 95/00 524/68 |

* cited by examiner

*Primary Examiner* — Christopher M Rodd
(74) *Attorney, Agent, or Firm* — Laubscher & Laubscher, P.C.

(57) ABSTRACT

A polymer modified asphalt (PMA) includes a modifier material mixed with hot asphalt to form a modified asphalt mixture and in which a gelatinous carrier material is mixed with an acidic activator material and a curing agent to form a solid crosslinking agent. The solid crosslinking agent is mixed with the modified asphalt mixture to produce a modified asphalt material having improved rheological characteristics which prevents gel and lump formation in PMA.

17 Claims, 5 Drawing Sheets

MODIFIED ASPHALT WITH GELATINOUS CARRIER MATERIAL

BACKGROUND OF THE INVENTION

The present invention relates to improved modified asphalt characterized by better binding of the modifier material to the asphalt.

The addition of polymers to asphalt improves the physical and mechanical properties of the asphalt. The most commonly used polymers are styrene butadiene styrene (SBS), styrene butadiene (SB) and styrene butadiene rubber (SBR). Polymer modified asphalts (PMA) are used in pavement and roofing materials. Modified asphalts and asphalt emulsions are primarily produced through conjugated-diene backbone type polymers.

A number of techniques are currently used to link polymers with asphalt. One technique is to use asphalt binders. However, such binders do not meet all of the requirements developed by the SUPERPAVE protocol. Inferior binders result in damage to asphalt pavement including permanent deformation, thermal cracking and flex fatigue. These damages diminish the life of the pavement.

Another linking technique uses additives to assist with coupling the polymer modifier material to asphalt molecules to produce polymer modified asphalts. These coupling additives include alkyl polysulfide, poly phosphoric acid, dithio, carbamates, phosphorous, penta-sulfide, 4-4'-dithiomopholine, furfural, thiozole derivatives, phosphorous pentoxide, hydrogen peroxide, sodium hydroxide, sulfur trioxide.

A major drawback of conventional polymer modified asphalts is that the asphalt develops a gel in certain portions thereof resulting from over-reactivity of the linking or activator material. This is particularly the case where polymer modified asphalt is stored prior to installation. Gel formation makes the polymer modified asphalt difficult to work with and install. Additional drawbacks include separation between the top and bottom of the polymer modified asphalt, as well as reduced elastic recovery.

BRIEF DESCRIPTION OF THE PRIOR ART

Polymer modified asphalts are well-known in the prior art as evidenced by the Memon U.S. Pat. No. 6,444,731, the Krivohlavek U.S. Pat. No. 6,451,886, the Liang U.S. Pat. No. 6,429,241, the Izumoto U.S. Patent Application Publication No. 20020111401, and the Memon U.S. Pat. No. 6,818,687. These references disclose the use of different linking additives to generate stable polymer modified asphalt, especially for polymers including conjugated-diene. The modified asphalts are stable in storage and are easy to transport.

SUMMARY OF THE PRESENT INVENTION

The present invention relates to a method for making modified asphalt in which a modifier material is mixed with hot asphalt to form a modified asphalt mixture and in which a gelatinous carrier material is mixed with an acidic activator material in the presence of a curing agent to form a solid crosslinking agent. The gelatinous carrier is 35-65% by weight of the acidic activator material. The solid crosslinking agent is then mixed with the modified asphalt mixture to produce a modified asphalt material having improved rheological characteristics.

The modifier material is preferably a polymer or granular crumb rubber. Suitable polymers include styrene butadiene styrene (SBS), styrene butadiene (SB) and styrene butadiene rubber (SBR). The gelatinous carrier material is preferably an animal material, agricultural product, or similar product that has a specific gravity of approximately 0.79 g/cm$^2$. The activator material preferably contains trace amounts of sulfur and has a specific gravity of approximately 0.80 g/cm$^2$. The activator can also include a phenyl formaldehyde resin with hexamethylene tetramine as a curing agent.

BRIEF DESCRIPTION OF THE DRAWINGS

Other objects and advantages of the invention will become apparent from a study of the following specification when viewed in the light of the accompanying drawing, in which.

DETAILED DESCRIPTION

Figure 1:
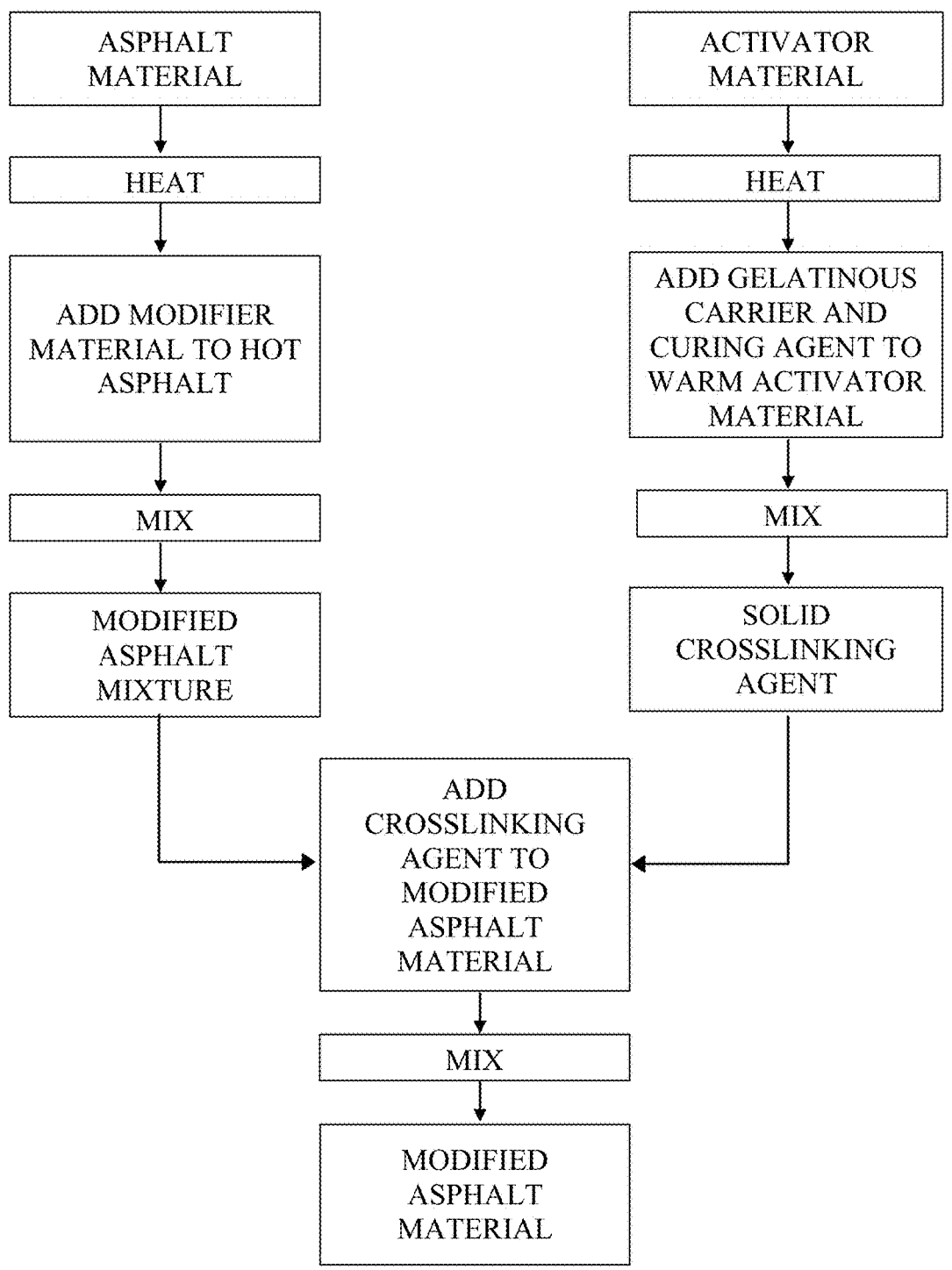
FIG. 1 is a flow diagram showing the method steps for making modified asphalt according to a preferred embodiment of the invention.

A method for making modified asphalt according to the invention will be described with reference to FIG. 1. An asphalt material is heated and then a modifier material is added and mixed with the asphalt. The result is a modified asphalt mixture. Preferably, the asphalt has a performance grade (PG) of 52-34, 58-28, or 64-22. The modifier is a conjugated-diene backbone type polymer such as styrene butadiene styrene (SBS), styrene butadiene (SB) and styrene butadiene rubber (SBR). An example of SBR is granular crumb rubber obtained from discarded automobile tires.

An acidic activator material is heated and a gelatinous carrier material is added to it and then mixed. The result is a solid crosslinking agent. The activator used is preferably PT-523 or a similar activator with a specific gravity of approximately 0.80 g/cm$^2$ at room temperature. Further, the preferred activator contains a trace amount of sulfur, such as that disclosed in the Memon U.S. Pat. No. 6,444,731. If desired, a micro activator material such as phenyl formaldehyde resin is included with the activator material with a curing agent. The gelatinized carrier material has a specific gravity similar to that of the activator material, and is preferably derived from an animal oil or agricultural product with a specific gravity of approximately 0.79 g/cm$^2$. The activator material and gelatinous material are mixed at an elevated temperature of 60°-85° C. and then further elevated to a temperature of 65°-105° C. to produce the solid crosslinking agent. The solid crosslinking agent is preferably a powder, granular, or pellet material.

The modified asphalt mixture and solid crosslinking agent are mixed. The activator enhances linking of the polymer to the asphalt molecules, while the gelatinous carrier prevents the formation of gel or lumping in the polymer modified asphalt mixture. The resulting polymer modified asphalt with the crosslinking agent has improved rheological characteristics and better stability in storage.

Figure 2:
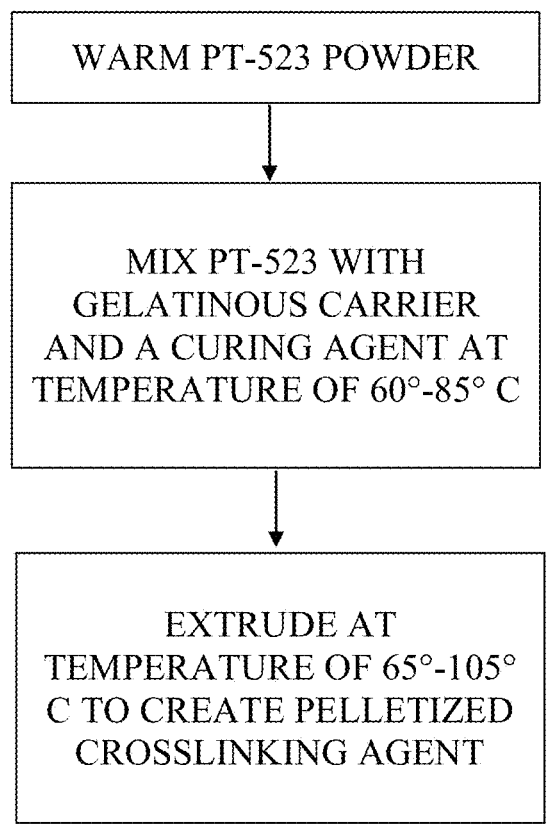
FIG. 2 is a flow diagram showing the method steps for making a pelletized crosslinking agent according to a preferred embodiment of the invention.

Referring to FIG. 2, the method for making the pelletized crosslinking agent will be described. The activator material is in powder form, preferably PT-523, and is heated. The heated activator material is then mixed with a gelatinous carrier agent, preferably derived from an animal oil or agricultural product, at a temperature of 60°-85° C. The material is then extruded at a temperature of 65°-105° C. to create a pelletized crosslinking agent with or without water that can be used with polymer modified asphalt (PMA) to create a PMA with improved rheological properties. The pellets are extruded at a size no longer than 1" in length and with a diameter of ¼"-⅜".

Figure 3:
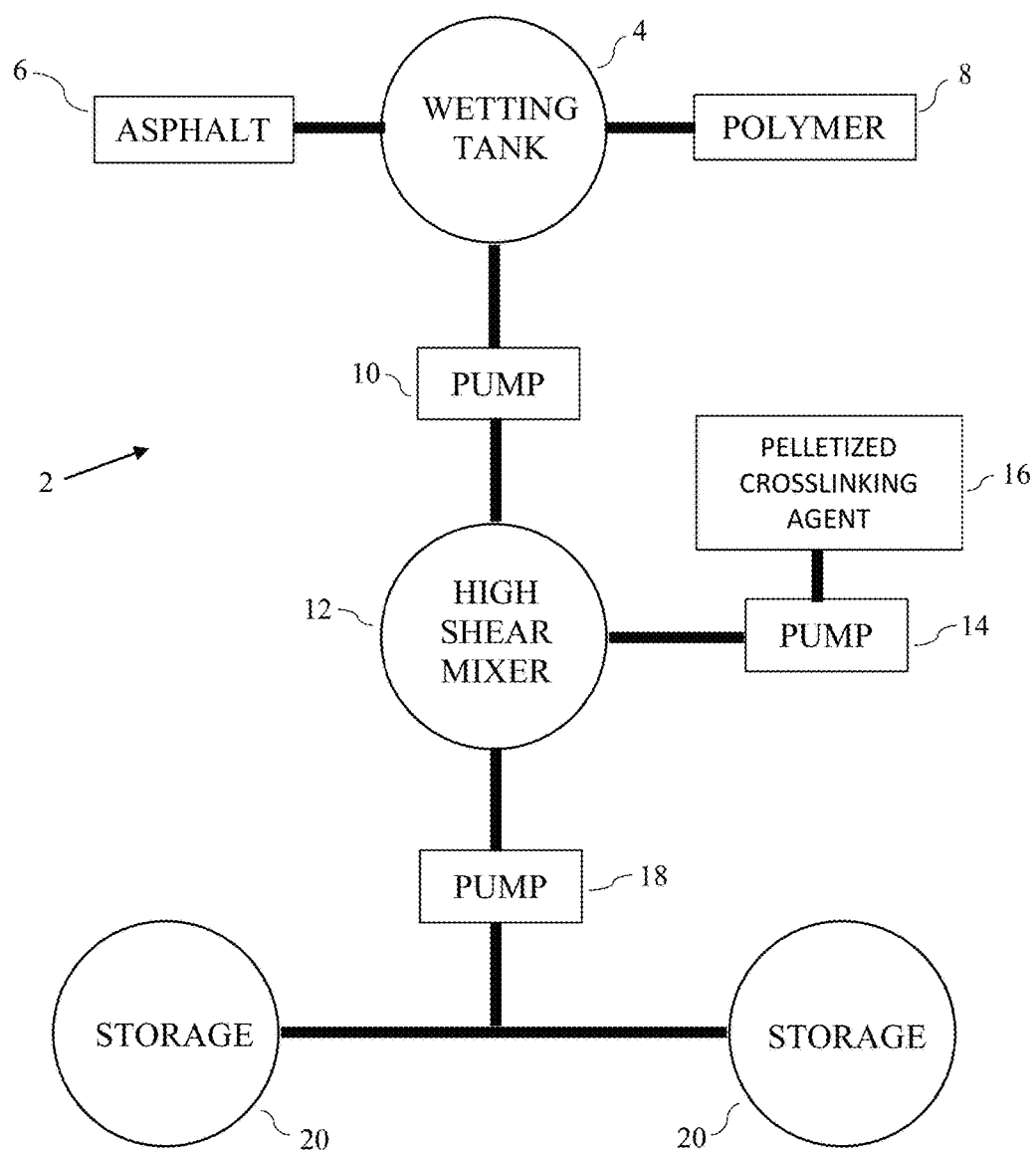
FIG. 3 is a schematic diagram of an apparatus for making the modified asphalt according to a preferred embodiment of the invention.

Referring to FIG. 3, there is shown an apparatus 2 for creating the polymer modified asphalt (PMA) with a crosslinking agent, as disclosed herein. The apparatus includes a wetting tank 4 in which an asphalt 6 and polymer 8 can be mixed to create a modified asphalt mixture. The wetting tank is connected with a pump 10 that pumps the modified asphalt mixture into a high shear mixer 12. A separate pump 14, also connected with the high shear mixer, pumps a pelletized crosslinking agent 16, into the high shear mixer 12. The high shear mixer 12 mixes the modified asphalt mixture and the pelletized crosslinking agent to create a polymer modified asphalt material with a solid crosslinking agent. That material is then pumped by a separate pump 18 into storage tanks 20 where the polymer modified asphalt mixture with the crosslinking agent can be stored for future use.

Set forth below in Table I are the continuous performance grades (PG) for certain polymer modified asphalts (PMA) with and without the activator, and for those including the activator, with and without the carrier.

TABLE I

| Asphalt Used | Cont. PG of the Base Asphalt | PG of the PMA with activator & without carrier | PG of the PMA with activator & with carrier | Amount of SBS used |
| --- | --- | --- | --- | --- |
| PG 64-22 | 65-23 | 78-24 | 77-25 | 3% |
| PG 58-28 | 59-28 | 71-29 | 71-29 | 3% |
| PG 52-34 | 53-35 | 66-36 | 66-36 | 3% |

For each asphalt the performance grade (PG) demonstrates the average high temperature in degrees Celsius and the average low temperature in degrees Celsius that the asphalt can withstand. For instance, PG 64-22 is generally stable in an environment with an average high temperature of 64° C. and an average low temperature of −22° C.

As is demonstrated in Table I, the continuous performance grade (PG) of the asphalt is improved when the activator material is used, and is nearly identical when the polymer modified asphalt (PMA) does or does not have the gelatinous carrier material. The PMA with the gelatinous carrier is preferred because it does not reduce the PG and it improves the overall product by preventing gel and lump formation.

Figure 4:
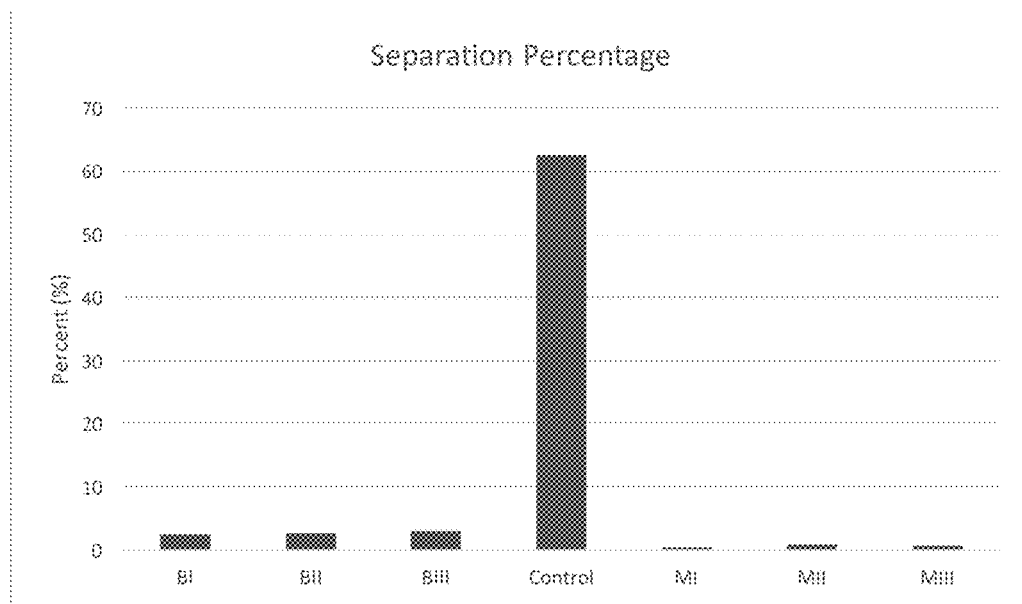
FIG. 4 is a graph showing the separation percentage of modified asphalts.

Referring now to FIG. 4, there is shown the separation, homogeneity or stability behavior between the top and bottom of the asphalt for neat asphalt, represented in the graph as BI, BII and BIII, polymer modified asphalt (PMA) without the crosslinking agent, represented in the graph as the Control, and PMA with the crosslinking agent, represented in the graph as MI, MII and MIII.

The separation percentage for all three neat asphalts (BI, BII and BIII), per PP-5-93[5] (a test method for determining separation characteristics) is 2.5-3%. The separation percentage for the polymer modified asphalt (PMA) without the crosslinking agent (Control) is 62.5%, and the separation percentage for the PMA with the crosslinking agent (MI, MII and MIII) 0.4-0.9%. The separation percentage between the top and bottom of the asphalt is lowest, and thus best, in the PMA with the crosslinking agent.

Figure 5:
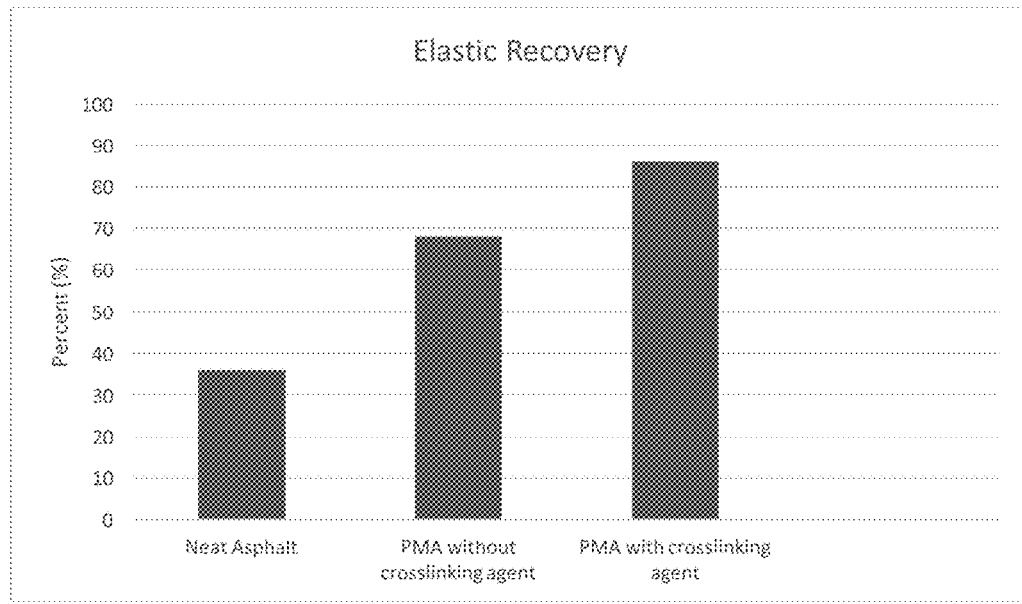
FIG. 5 is a graph showing the elastic recovery of modified asphalts.

Referring now to FIG. 5, the elastic recovery (ER) for neat asphalts, for polymer modified asphalts (PMA) without the crosslinking agent, and for PMA with the crosslinking agent is shown. Elastic recovery demonstrates the durability and overall quality of an asphalt. The higher the ER the better the asphalt. The neat asphalt (without polymers) has an ER of 36%, the PMA without a crosslinking agent has an ER of 68%, and the PMA with a crosslinking agent has an ER of 86%. The ER, and thus the quality of the asphalt, is highest in the PMA with the crosslinking agent.

Figure 6:
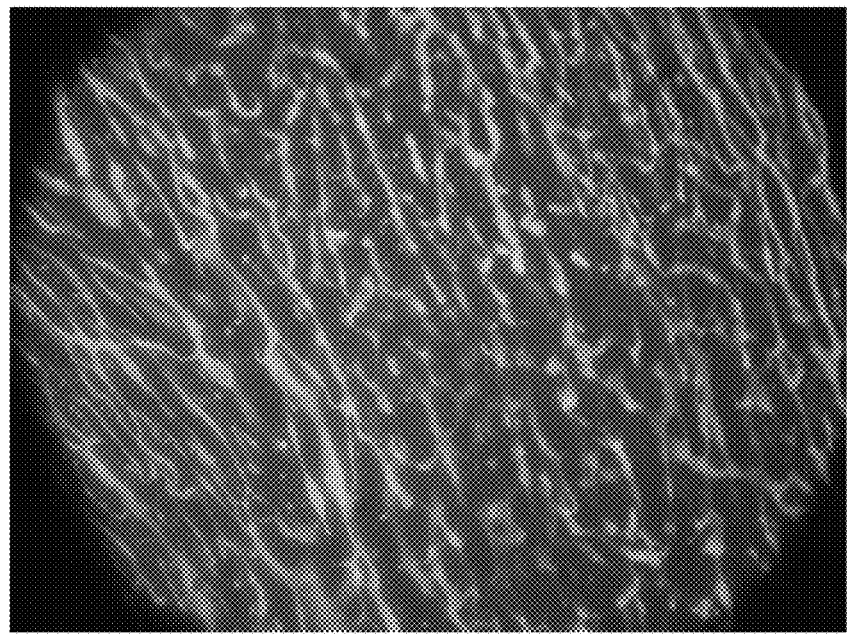
FIG. 6 is a fluorescent microscopic picture of unlinked, storage unstable polymer modified asphalt.
Figure 7:
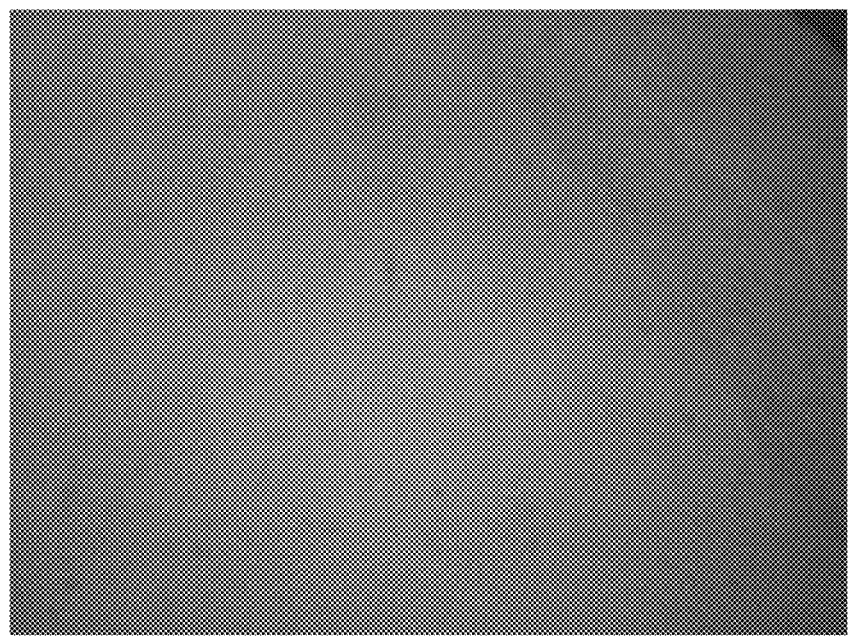
FIG. 7 is a fluorescent microscopic picture of linked, storage stable polymer modified asphalt.

Referring now to FIGS. 6 and 7, fluorescent microscopic views of the polymer modified asphalt (PMA) with and without the crosslinking agent are shown. FIG. 6 shows fluorescent light shining through a PMA without the crosslinking agent. This is because the double bond of butadiene remains in PMA without the crosslinking agent. The double bond of butadiene prevents the polymer molecule from forming the proper network with the asphalt molecule, and thus a heavy separation or instability between the polymer and asphalt results. This creates a PMA that is less storage stable and not homogenous throughout.

FIG. 7 shows no fluorescent light shining through the polymer modified asphalt (PMA) with the crosslinking agent. This is because the double bond of butadiene is broken in PMA with the crosslinking agent which allows the polymer molecules to link with the asphalt molecules, creating a polymer network and resulting in storage stable PMA with significantly less separation, enhanced rheological properties, and improved elastic behavior.

While the preferred forms and embodiments of the invention have been illustrated and described, it will be apparent to those of ordinary skill in the art that various changes and modifications may be made without deviating from the inventive concepts set forth above.

What is claimed is:

1. A method for making a modified asphalt material, comprising the steps of:
    (a) mixing a modifier material with asphalt to form an asphalt mixture;
    (b) mixing a gelatinous carrier material with an acidic activator material at an initial temperature of 60-85° C. to form a solid crosslinking agent, wherein said gelatinous material:
        i. is derived from one of an animal material and agricultural product having a specific gravity in the vicinity of 0.79 grams per centimeter squared; and
        ii. is 35-65% by weight of said acidic activator material; and
    (c) mixing said solid crosslinking agent with said asphalt mixture to produce a modified asphalt material which has improved rheological, separation and solubility characteristics.

2. A method as defined in claim 1, wherein said modifier material is selected from the group including polymer and granular crumb rubber.

3. A method as defined in claim 2, wherein said activator material contains a trace amount of sulfur.

4. A method as defined in claim 3, wherein said activator material further comprises a phenyl formaldehyde resin.

5. A method as defined in claim 4, wherein said activator material further comprises a curing agent.

6. A method as defined in claim 5, wherein said curing agent comprises hexamethylene tetramine.

7. A method as defined in claim 5, wherein said solid crosslinking agent is one of a powder, granular, and pelletized material.

8. A method as defined in claim 1, wherein said mixed gelatinous carrier material and acidic activator material is elevated to a temperature of 65°-105° C. to form said solid crosslinking agent.

9. A method as defined in claim 7, wherein said solid crosslinking agent and said asphalt mixture is heated to 130°-210° C. to produce said modified asphalt material.

10. A modified asphalt material, comprising:
   (a) hot asphalt;
   (b) a granular modifier material;
   (c) a solid crosslinking agent for crosslinking said asphalt and said granular modifier material, produced from mixing a gelatinous carrier material and acidic activator material at an initial temperature of 60°-85° C., wherein:
      i. said gelatinous material is derived from one of an animal material and agricultural product having a specific gravity in the vicinity of 0.79 grams per centimeter squared; and
      ii. said gelatinous carrier material is 35-65% by weight of said acidic activator material, whereby said solid crosslinking agent activates and links said hot asphalt and modifier material to produce a modified asphalt product with improved rheological, separation and solubility characteristics.

11. A modified asphalt material as defined in claim 10, wherein said modifier material is selected from the group consisting of polymer and granular crumb rubber.

12. A modified asphalt material as defined in claim 10, wherein said activator material contains a trace amount of sulfur.

13. A modified asphalt material as defined in claim 1, wherein said activator material further comprises a phenyl formaldehyde resin.

14. A method as defined in claim 13, wherein said activator material further comprises a curing agent.

15. A method as defined in claim 14, wherein said curing agent comprises hexamethylene tetramine.

16. A modified asphalt material as defined in claim 10, wherein said solid crosslinking agent is one of a powder, granular, or pelletized material.

17. A modified asphalt material as defined in claim 10, wherein said gelatinous carrier material and acidic activator material mixture is elevated to a temperature of 65°-105° C. to form said solid crosslinking agent.

* * * * *